United States Patent Office

3,062,778
Patented Nov. 6, 1962

3,062,778
HIGH IMPACT STRENGTH VINYL CHLORIDE
RESIN COMPOSITIONS BLENDED WITH ETHYL-
ENE-ALKYL ACRYLATE COPOLYMERS
Russell Van Cleve, Charleston, and Dennis H. Mullins,
St. Albans, W. Va., assignors to Union Carbide Corpo-
ration, a corporation of New York
No Drawing. Filed Nov. 16, 1959, Ser. No. 852,998
10 Claims. (Cl. 260—45.5)

The present invention relates to homogeneous vinyl chloride resin compositions having improved physical properties and processing characteristics. More particularly, this invention is concerned with novel resin blends containing both a vinyl chloride resin and a minor proportion of a copolymer resin of ethylene with an alkyl acrylate ester. The present invention is also concerned with the improved rigid plastic alloys produced from, and comprised of, the aforementioned resin blends.

Vinyl chloride resins are, in general, rigid compositions characterized by a high degree of resistance to chemical attack, and consequently, have come into extensive use in the chemical processing industries and in other manufacturing applications. Vinyl chloride resins are, for example, widely used as moldings, piping, sheeting and the like. Unfortunately, however, unplasticized or slightly plasticized vinyl chloride resins usually prove quite brittle. Hence, for practical purposes, many uses which require a resin possessing a relatively high impact strength are precluded in the case of vinyl chloride resins. Moreover, vinyl chloride resins are often difficult to flux and sheet on conventional steam-heated equipment. This disadvantage is aggravated by the tendency of vinyl chloride resins to decompose before reaching a melt viscosity sufficiently low so as to assure the good flow characteristics necessary to successful milling and molding operations.

Heretofore, attempts to improve the physical properties and processing characteristics, and particularly the impact strength, of vinyl chloride resins by the incorporation of substantial quantities of plasticizers, butadiene rubbers or similar compounding ingredients have ordinarily proven unsatisfactory in that any improvement obtained in such a manner has frequently been accompanied by an undue sacrifice of other desirable physical properties, such as the heat-distortion temperature, the light stability or the chemical resistance of the resins, etc. For this reason, among others, the development of improved vinyl chloride resin compositions has continued to receive attention from those skilled in the art.

It has now been found that the impact strength of vinyl chloride resin compositions can be enhanced appreciably without disadvantage to other of their desirable physical properties by blending the vinyl chloride resins with minor quantities of an ethylene-alkyl acrylate copolymer resin. In many instances, these blends have also been found more easy to process, than the unblended vinyl chloride resins which they contain. This improvement is evidenced by the fact that the resin blends can frequently be milled and/or molded at a temperature below the corresponding temperature required for the processing of the unblended vinyl chloride resin. In addition, the rigid plastic alloys produced from, and comprised of, the resin blends of this invention, as herein described, can be used in any of the applications where vinyl chloride resins have heretofore been employed and, in any given formulation, will ordinarily exhibit properties equal or superior to those of the vinyl chloride resin which they contain. In particular, the rigid plastic alloys of this invention are especially well suited for use in applications where improved impact strength at no significant reduction in heat distortion temperature is of salient importance, such as in piping, scuff panels, structural materials in general, and the like.

The vinyl chloride resins contemplated by this invention include homopolymers of vinyl chloride as well as copolymers thereof with minor proportions of other ethylenically unsaturated compounds. Preferably, the vinyl chloride resin employed is a homopolymer of vinyl chloride, i.e., poly(vinyl chloride), since the most rigid compositions are ultimately obtainable therefrom. However, the vinyl chloride resin can also contain up to about 20 percent by weight of other ethylenically unsaturated compounds copolymerizable with vinyl chloride; conversely stated, the resin should have at least about 80 percent by weight of vinyl chloride copolymerized therein. Other ethylenically unsaturated compounds which are suitable in this respect include, for example, vinyl alkylates, such as vinyl acetate, vinyl propionate and the like; vinylidene halides, such as vinylidene bromide, vinylidene chloride, vinylidene fluorochloride and the like; unsaturated hydrocarbons, such as ethylene propylene, isobutylene and the like; allyl compounds such as allyl acetate, allyl chloride, allyl ethyl ether and the like, etc. Thus, as employed herein, the term "vinyl chloride resin" is meant to include both poly(vinyl chloride) and copolymers of vinyl chloride and other ethylenically unsaturated monomers.

The molecular weight of the vinyl chloride resins suitable for use in this invention can vary over a broad range. Preferably, the vinyl chloride resin utilized is one having a molecular weight corresponding to a reduced viscosity in the range of from about 0.5 to about 1.5 whereby optimum conditions, determinable for instance in terms of processing ease, are attained. The advantages accruable in accordance with this invention can, however, also be realized with higher or lower molecular weight vinyl chloride resins.

By the term "reduced viscosity," as used herein, is meant a value obtained by dividing the specific viscosity of the vinyl chloride resin in a cyclohexanone solution by the concentration of the resin in the solution, the concentration being calculated in grams of resin per 100 milliliters of solvent at a given temperature. The specific viscosity is obtained by dividing the difference between the viscosity of the resin solution and the viscosity of the solvent by the viscosity of the solvent.

The reduced viscosity is a measure of the molecular weight of the resin. A higher reduced viscosity indicates a higher molecular weight polymer. Conversely, a lower reduced viscosity indicates a lower molecular weight polymer. In all cases, the reduced viscosity values set forth herein are determined at a concentration of 0.2 gram of resin per 100 milliliters of solvent and at a temperature of 20° C.

The vinyl chloride resins and the methods of their manufacture are well known to the art. Resins of this nature are, by way of illustration, discussed more fully in the U.S. Patent 2,802,809. Such resins can be produced by conventional bulk suspension or solution methods of polymerization. Typical polymerization procedures for the production of the vinyl chloride resins are described, for instance, in Schildknecht, "Vinyl and Related Polymers," John Wiley and Sons, 1952, chapter VII.

The ethylene-alkyl acrylate copolymer resins contemplated by this invention are, in the broadest sense, the copolymer resins containing from about 2 percent to about 65 percent by weight of the alkyl acrylate component. In particular, the alkyl acrylate can be defined more clearly by the general formula $CH_2=CHCOOR$ wherein R designates a linear or branch-chained alkyl radical preferably containing from 1 to about 20 carbon atoms, or slightly higher, and more preferably from 1 to about 12 carbon atoms. As typical of these alkyl acrylates, there can be mentioned, for example, methyl acrylate, ethyl acrylate, propyl acrylate, butyl acrylate, 2-ethylhexyl acrylate, dodecyl acrylate, octadecyl acrylate, eicosyl acrylate and the like.

As with the vinyl chloride resins hereinabove described, the molecular weight of the ethylene-alkyl acrylate copolymer resins suitable for use in this invention can vary over a wide range. Moreover, it has been found that the use of higher molecular weight ethylene-alkyl acrylate copolymer resins in accordance with this invention generally leads to the formation of rigid plastic alloys having higher impact strength. On the other hand, greater processing ease, i.e. ease of dispersion in blends with the vinyl chloride resins, is realized with the lower molecular weight ethylene-alkyl acrylate copolymer resins. With a view to balancing these counteracting effects, the ethylene-alkyl acrylate copolymer resin employed is one having a molecular weight preferably corresponding to melt index in the range of from about 1 to about 500, and more preferably, corresponding to a melt index in the range of from about 2 to about 50. Good results can also be obtained in this connection using higher or lower molecular weight copolymer resins.

The term "melt index" as employed herein is, in all instances, meant to define the value determined in accordance with A.S.T.M. Method D1238–52T, and is expressed in units of decigrams per minute at a temperature of 190° C. and under a pressure of 43.1 p.s.i. The melt index is a measure of the molecular weight of the resin. A lower melt index indicates a higher molecular weight polymer. Conversely, a higher melt index indicates a lower molecular weight polymer.

In addition to the molecular weight of the ethylene-alkyl acrylate copolymer resin, the concentration or proportion of the alkyl acrylate component in the copolymer resin has also been found to have an effect upon the impact strength of the rigid plastic alloys produced in accordance with this invention. For example, an increase in the alkyl acrylate content of the copolymer resin used ordinarily engenders a corresponding increase in the impact strength of the final product. As the alkyl acrylate content of the copolymer resin increases above about 35 percent by weight, and particularly above about 65 percent by weight, however, the copolymer resin becomes increasingly soft and gummy. Hence, practical operating considerations of manufacture and subsequent processing lead to the exclusion of ethylene-alkyl acrylate copolymer resins containing substantially in excess of about 65 percent by weight of the alkyl acrylate component in the commercial production of the resin blends of this invention. On the other hand, little improvement in impact strength is generally realized by the use of an ethylene-alkyl acrylate copolymer resin containing appreciably less than about 3 percent by weight of the alkyl acrylate component. Thus, while the alkyl acrylate content of the ethylene-alkyl acrylate copolymer resin utilized in accordance with this invention can vary broadly between about 3 percent by weight, or slightly lower, and about 65 percent by weight, or slightly higher, in view of the aforementioned effects, the preferred copolymer resin for use in this invention is one having an alkyl acrylate content of between about 10 percent by weight and about 35 percent by weight.

The ethylene-alkyl acrylate copolymer resins described herein, and the methods of their production, are also well known to the art. The copolymer resins can be obtained for example, by the reaction of ethylene with an alkyl acrylate using the high pressure techniques disclosed in U.S. Patent 2,200,429, or in any other convenient manner. Good results have been obtained in this respect by carrying out the polymerization in bulk at pressures of from 25,000 p.s.i. to 30,000 p.s.i. and at temperatures varied between 180° C. and 240° C. to obtain polymer samples of different molecular weight.

The resin blends of vinyl chloride resins with ethylene-alkyl acrylate copolymer resins produced in accordance with this invention contain from about 2 to about 30 percent by weight of the copolymer resin, with from about 5 to about 15 percent by weight of the copolymer resin being preferred. Somewhat higher or lower copolymer resin contents are also satisfactory in this respect. In general, an increase in the copolymer resin content of the resin blend, and therefore of the rigid plastic alloys produced therefrom, engenders a corresponding increase in the impact strength of the final product, other factors being constant, until a maximum effect at a copolymer resin content of from about 5 to about 15 percent by weight is reached. Thereafter, the impact strength gradually decreases and a slight reduction in the heat-distortion temperature of the product may also be observed. At a copolymer resin content substantially less than about 2 percent by weight, little if any improvement in impact strength is realized, while the minor improvements in impact strength obtainable at copolymer resin contents in excess of about 30 percent by weight may be offset by the significant decrease in heat-distortion temperature that is often concomitant therewith.

In the practice of this invention, the vinyl chloride resin and the ethylene-alkyl acrylate copolymer resin can be blended in any convenient manner. A suitable procedure, for instance, involves manually or mechanically admixing the resins in proportions as hereinabove described in an unheated container and adding the mixture to an equal-speed two-roll mill maintained at a temperature of from 150° C. to 180° C. The mixture fluxes readily at these temperatures to form a smooth sheet which after about five minutes of milling can be stripped from the rolls and cooled to yield a homogeneous rigid plastic alloy sheet evidencing high impact strength. Other methods of mixing and processing are equally effective. For example, the resin mixture can be added to a hot Banbury mill for fluxing and homogenizing and then fed to a hot roll mill or calender for the sheeting operation. Still other methods of processing will occur to those skilled in the art and can be employed satisfactorily in accordance with this invention.

Minor amounts of conventional stabilizers and/or inhibitors such as those ordinarily used with vinyl chloride resins may also be incorporated in the resin blend. Illustrative of these stabilizers or inhibitors are: dibutyltin dilaurate, dibutyltin maleate, basic lead carbonate, lead oxide, alkaline earth silicates, hydroquinones, lead phenolate, aromatic compounds containing phenolic and amino groups and the like. Particularly good results have been obtained with dibutyltin dilaurate and maleate. Moreover, while any stabilizing or inhibiting quantity can be employed, the stabilizers and/or inhibitors described above are preferably incorporated in the resin blends of this invention used in a total concentration of from about 0.1 percent to about 10 percent by weight based upon the weight of the vinyl chloride resin.

The present invention can be illustrated further in connection with the following specific examples of its practice.

EXAMPLE I

A series of experiments, recorded as run Nos. 1 to 5, were conducted to determine the impact strength and heat-distortion temperature of both poly (vinyl chloride) resin and several blends of poly (vinyl chloride) resin with an ethyleneethyl acrylate copolymer resin containing 13.2 percent by weight of the ethyl acrylate component and having a melt index of 2.3. The poly (vinyl chloride) resin employed in the experiment had a reduced viscosity of 0.75. A heat stabilizer, viz. dibutyltin dilaurate, was also included in the composition run Nos. 1 to 5 in a concentration of 1.5 percent by weight based upon the weight of the poly (vinyl chloride) resin, while in run Nos. 6 and 7, a combination of 2 percent by weight of dibasic lead phosphite and 1 percent by weight of dibasic lead stearate, based upon the weight of poly(vinyl chloride) resin was employed as the stabilizer. Resin blends containing 5 percent, 10 percent and 15 percent by weight of the ethylene-ethyl acrylate copolymer resin were prepared. Control experiments were also conducted using unblended poly(vinyl chloride) resin and in one instance, employing 5 percent by weight of a di(2-ethylhexyl) phthalate plasticizer for the poly(vinyl chloride) resin. The various compositions were fluxed and homogenized on a laboratory two-roll mill at a temperature of 165° C. After about 5 minutes of homogenizing, the mill opening was adjusted to obtain a sheet thickness of about 30 mils, and the resulting sheet then removed from the mill. Strips were cut from the milled sheets and thereafter compression molded at a temperature of 175° C. to obtain test specimens measuring 0.5 in. x 0.5 in. x 5.0 in. for use in heat-distortion temperature and Izod impact strength tests. The heat distortion temperature of the products was determined in accordance with A.S.T.M. Method D648–45T, measured at a stress of 264 p.s.i. The Izod impact strength of the products was determined in accordance with A.S.T.M. Method D256–56, Procedure A. The test results obtained for each run are tabulated below in Table A.

Table A

|  | Run No. | | | | | | |
|---|---|---|---|---|---|---|---|
|  | 1 | 2 | 3 | 4 | 5 | 6 | 7 |
| Poly (Vinyl Chloride) Resin (parts by weight) | 100 | 95 | 95.0 | 90.0 | 85.0 | 95 | 90 |
| Ethylene-Ethyl Acrylate Copolymer Resin (parts by weight) | | | 5.0 | 10.0 | 15.0 | 50 | 10 |
| Plasticizer (parts by weight) | | 5 | | | | | |
| Milling Temperature (° C.) | 165 | 165 | 165 | 165 | 165 | 165 | 165 |
| Molding Temperature (° C.) | 175 | 175 | 175 | 175 | 175 | 175 | 175 |
| Izod Impact Strength (ft. lb.) | 0.5 | 0.4 | 2.1 | 2.3 | 1.1 | 4.0 | 1.7 |
| Heat-Distortion Temperature (° C.) | 76 | 59 | 76 | 77 | 76 | 77 | 77 |

It can be seen from the above Table that the impact strength of the rigid plastic alloy products of this invention are superior to that of the unblended poly(vinyl chloride) resin. In addition, the heat-distortion temperature of the products are equal to, or desirably higher, than that of the unblended poly(vinyl chloride) resin in all instances.

EXAMPLE II

The following experiments were performed in the manner and using the same poly(vinyl chloride) resin and tin stabilizer described in Example I. The ethylene-ethyl acrylate copolymer resin employed in each experiment contained 16.9 percent of the ethyl acrylate component and had a melt index of 51.0. Operating conditions and the test results of this series of experiments are tabulated below in Table B.

Table B

|  | Run No. | | |
|---|---|---|---|
|  | 1 | 2 | 3 |
| Poly (Vinyl Chloride) Resin (parts by weight) | 95.0 | 90.0 | 85.0 |
| Ethylene-Ethyl Acrylate Copolymer Resin (parts by weight) | 5.0 | 10.0 | 15.0 |
| Milling Temperature (° C.) | 165 | 165 | 165 |
| Molding Temperature (° C.) | 175 | 175 | 175 |
| Izod Impact Strength, (ft. lbs.) | 1.5 | 1.4 | 0.7 |
| Heat Distortion Temperature, (° C.) | 75 | 73 | 73 |

It can be seen from the above table, upon comparison with run No. 1 of Table A in Example I, that the rigid plastic alloy products containing the ethylene-ethyl acrylate copolymer are, in each instance, superior to the unblended poly(vinyl chloride) resin in impact strength and that this improvement is obtained at a negligible sacrifice in the heat-distortion temperature of the products.

EXAMPLE III

The following experiments were conducted in the manner and using the same poly(vinyl chloride) resin and tin stabilizer described in Example I. In run No. 1, the ethylene-ethyl acrylate copolymer resin employed contained 3.8 percent by weight of the ethyl acrylate component and had a melt index of 0.9; in run Nos. 2 to 4, the ethylene-ethyl acrylate copolymer resin contained 60.6 percent by weight of the ethyl acrylate component and had a melt index of 36. Operating conditions and the test results of this series of experiments are tabulated below in Table C, from which table the advantages accruable in accordance with this invention can be seen.

Table C

|  | Run No. | | | |
|---|---|---|---|---|
|  | 1 | 2 | 3 | 4 |
| Poly (Vinyl Chloride) Resin (parts by weight) | 95.0 | 95.0 | 88.4 | 85.0 |
| Ethylene-Ethyl Acrylate Copolymer Resins (parts by weight) | 5.0 | 5.0 | 11.6 | 15.0 |
| Milling Temperature (° C.) | 165 | 165 | 165 | 165 |
| Molding Temperature (° C.) | 175 | 175 | 175 | 175 |
| Izod Impact Strength (ft. lbs.) | 1.8 | 1.0 | 2.3 | 5.3 |
| Heat Distortion Temperature (° C.) | 73 | 72 | 69 | 67 |

EXAMPLE IV

The following experiments were conducted in the manner and using the same poly(vinyl chloride) resin and tin stablizer described in Example I. In run Nos. 1 to 3, the ethylene-ethyl acrylate copolymer resin employed contained 15.8 percent by weight of the ethyl acrylate component and had a melt index of 12.0; in run Nos. 4 to 6, the ethylene-ethyl acrylate copolymer resin contained 35.7 percent by weight of the ethyl acrylate component and had a melt index of 2.0. Operating conditions and the test results of this series of experiments are tabulated below in Table D, from which table the advantages accruable in accordance with this invention can be seen.

Table D

|  | Run No. | | | | | |
|---|---|---|---|---|---|---|
|  | 1 | 2 | 3 | 4 | 5 | 6 |
| Poly (Vinyl Chloride) Resin (parts by weight) | 95.0 | 85.0 | 75.0 | 97.5 | 95.0 | 92.5 |
| Ethylene - Ethyl Acrylate Copolymer Resins (parts by weight) | 5.0 | 15.0 | 25.0 | 2.5 | 5.0 | 7.5 |
| Milling Temperature (° C.) | 165 | 165 | 165 | 165 | 165 | 165 |
| Molding Temperature (° C.) | 175 | 175 | 175 | 175 | 175 | 175 |
| Izod Impact Strength (ft. lbs) | 1.7 | 1.3 | 0.9 | 0.9 | 1.7 | 2.6 |
| Heat Distortion Temperature (° C.) | 74 | 73 | 67 | 72 | 72 | 74 |

EXAMPLE V

The following experiments were conducted in the manner and using the same poly(vinyl chloride) resin and tin stabilizer described in Example I. Various other ethylene-alkyl acrylate copolymer resins were substituted for the ethylene-ethyl acrylate copolymer resin in preparing the resin blends. In run Nos. 1 to 3, an ethylene-methyl acrylate copolymer resin containing 18.1 percent by weight of the methyl acrylate component and having a melt index of 0.48 was used; in run Nos. 4 and 5, an ethylene-butyl acrylate copolymer resin containing 25.8 percent by weight of the butyl acrylate component and having a melt index of 5.9 was used; in run Nos. 6 and 7, an ethylene-2-ethylhexyl acrylate copolymer resin containing 24.7 percent by weight of the 2-ethylhexyl acrylate component and having a melt index of 33.0. Operating conditions and the test results of this series of experiments are tabulated below in Table E.

Table E

|  | 1 | 2 | 3 | 4 | 5 | 6 | 7 |
|---|---|---|---|---|---|---|---|
| Poly(Vinyl Chloride) Resin (parts by weight) | 95.0 | 90.0 | 85.0 | 95.0 | 90.0 | 95.0 | 90.0 |
| Ethylene-Alkyl Acrylate Copolymer Resin (parts by weight) | 5.0 | 10.0 | 15.0 | 5.0 | 10.0 | 5.0 | 10.0 |
| Milling Temperature (° C.) | 165 | 165 | 165 | 165 | 165 | 165 | 165 |
| Molding Temperature (° C.) | 175 | 175 | 175 | 175 | 175 | 175 | 175 |
| Izod Impact Strength (ft. lbs.) | 2.0 | 2.9 | >15. | 1.6 | 1.7 | 1.9 | 1.1 |
| Heat Distortion Temperature (° C.) | 63 | 73 | 73 | 73 | 72 | 75 | 72 |

It can be seen from the above table, upon comparison with run No. 1 of Table A, in Example I, that the rigid plastic alloys prepared from blends of poly(vinyl chloride) resin with the various ethylene-alkyl acrylate copolymer resins, are, in all instances, superior to the unblended poly(vinyl chloride) resin in impact strength, and improvement which is realized at a negligible sacrifice in the heat-distortion temperature of the products.

EXAMPLE VI

In the manner described in Example I, a series of experiments were conducted to determine the impact strength and heat-distortion temperature of several vinyl chloride resins, both unblended and in blends with an ethylene-ethyl acrylate copolymer resin as provided for by this invention. In run Nos. 1 and 2, the vinyl chloride resin contained 3 percent by weight of ethylene copolymerized therein and had a reduced viscosity of 0.64; in run Nos. 3 and 4, the vinyl chloride resin contained 15 percent by weight of vinyl acetate copolymerized therein and had a reduced viscosity of 0.56. In run No. 2, the ethylene-ethyl acrylate copolymer resin contained 15.75 percent by weight of the ethyl acrylate copolymer and had a melt index of 12.0; in run No. 4, the ethylene-ethyl acrylate copolymer resin contained 13.2 percent by weight of the ethyl acrylate component and had a melt index of 2.3. Operating conditions and the test results of this series of experiments are tabulated below in Table F.

Table F

|  | Run No. | | | |
|---|---|---|---|---|
|  | 1 | 2 | 3 | 4 |
| Vinyl Chloride Resin (parts by weight) | 100 | 90 | 100.0 | 90.0 |
| Ethylene-ethyl acrylate copolymer resin (parts by weight) |  | 10 |  | 10.0 |
| Milling Temperature (°C.) | 140 | 135 | 115 | 115 |
| Molding Temperature (° C.) | 155 | 150 | 140 | 140 |
| Izod Impact Strength (ft. lbs.) | 0.3 | 2.4 | 0.4 | 1.1 |
| Heat-Distortion Temperature (° C.) | 64 | 65 | 65 | 65 |

It can be seen from the above table that the rigid plastic alloys of this invention are, in each instance, superior in impact strength to the unblended vinyl chloride resin. Moreover, in the case of vinyl chloride resin containing a minor quantity of ethylene copolymerized therein, the product of this invention can also be seen to be easier to process and to have a very slightly improved heat-distortion temperature.

What is claimed is:

1. A homogeneous vinyl chloride resin composition comprising a vinyl chloride resin and, blended therewith from about 2 percent to about 30 percent by weight based upon said resin composition of an ethylene-alkyl acrylate copolymer resin containing from about 3 percent to about 65 percent by weight of the alkyl acrylate component.

2. A homogeneous vinyl chloride resin composition comprising a vinyl chloride resin and, blended therewith, from about 2 percent to about 30 percent by weight based upon said resin composition of an ethylene-alkyl acrylate copolymer resin containing from about 10 to about 35 percent by weight of the alkyl acrylate component and having a molecular weight corresponding to a melt index of from about 1 to about 500.

3. A homogeneous vinyl chloride resin composition comprising a vinyl chloride resin and, blended therewith, from about 2 percent to about 30 percent by weight based upon said resin composition of an ethylene-alkyl acrylate copolymer resin containing from about 10 to about 35 percent by weight of the alkyl acrylate component and having a molecular weight corresponding to a melt index of from about 2 to about 50.

4. A homogeneous vinyl chloride resin composition comprising a vinyl chloride resin and, blended therewith from about 5 percent to about 15 percent by weight based upon said resin composition of an ethylene-alkyl acrylate copolymer resin containing from about 10 to about 35 percent by weight of the alkyl acrylate component and having a molecular weight corresponding to a melt index of from about 2 to about 50.

5. A homogeneous vinyl chloride resin composition comprising poly(vinyl chloride) resin having a molecular weight corresponding to a reduced viscosity of from about 0.5 to about 1.5, and, blended therewith, from about 5 percent up to about 15 percent by weight based upon said resin composition of an ethylene-ethyl acrylate copolymer resin containing from about 10 percent up to about 35 percent by weight of the ethyl acrylate component and having a melt index of from about 1 to about 500.

6. A homogeneous vinyl chloride resin composition comprising poly(vinyl chloride) resin having a molecular weight corresponding to a reduced viscosity of from about 0.5 to about 1.5, and, blended therewith, from about 5 percent up to about 15 percent by weight based upon said resin composition of an ethylene-butyl acrylate copolymer resin containing from about 10 percent up to about 35 percent by weight of the butyl acrylate component and having a melt index of from about 1 to about 500.

7. A homogeneous vinyl chloride resin composition comprising a polyvinyl chloride resin having a molecular weight corresponding to a reduced viscosity of from about 0.5 to about 1.5, and, blended therewith, from about 5 percent up to about 15 percent by weight based upon said resin composition of an ethylene-methyl acrylate copolymer resin containing from about 10 percent up to about 35 percent by weight of the methyl acrylate component and having a melt index of from about 1 to about 500.

8. A homogeneous vinyl chloride resin composition comprising polyvinyl chloride resin having a molecular weight corresponding to a reduced viscosity of from about 0.5 to about 1.5, and, blended therewith, from about 5 percent up to about 15 percent by weight based upon said resin composition of an ethylene-2-ethylhexyl acrylate copolymer resin containing from about 10 percent up to about 35 percent by weight of the 2-ethylhexyl acrylate component and having a melt index of from about 1 to about 500.

9. A homogeneous vinyl chloride resin composition comprising a vinyl chloride-ethylene copolymer resin containing up to about 20 percent by weight of the ethylene component and having a molecular weight corresponding to a reduced viscosity of from about 0.5 to about 1.5 and blended therewith, from about 5 percent to about 15 percent by weight of an ethylene-ethyl acrylate copolymer resin containing from about 10 percent to about 35 percent by weight of the ethyl acylate component and having a molecular weight corresponding to a melt index of from about 1 to about 500.

10. A homogeneous vinyl chloride resin composition comprising a vinyl chloride-vinyl acetate copolymer resin containing up to about 20 percent by weight of the vinyl acetate component and having a molecular weight corresponding to a reduced viscosity of from about 0.5 to about 1.5 and, blended therewith, from about 5 percent to about 15 percent by weight of an ethylene-ethyl acrylate copolymer resin containing from about 10 percent to about 35 percent by weight of the ethyl acrylate component and having a molecular weight corresponding to a melt index of from about 1 to about 500.

References Cited in the file of this patent

UNITED STATES PATENTS

| | | |
|---|---|---|
| 2,599,123 | Pinkney et al. | June 3, 1952 |
| 2,737,502 | Land et al. | Mar. 6, 1956 |
| 2,897,176 | Rocky et al. | July 28, 1959 |
| 2,953,541 | Pecha et al. | Sept. 20, 1960 |
| 2,982,670 | Jeff | May 2, 1961 |

UNITED STATES PATENT OFFICE
CERTIFICATE OF CORRECTION

Patent No. 3,062,778                      November 6, 1962

Russell Van Cleve et al.

It is hereby certified that error appears in the above numbered patent requiring correction and that the said Letters Patent should read as corrected below.

Column 4, line 64, for "5" read -- 7 --; line 67, for "ethyleneethyl" read -- ethylene-ethyl --; column 5, Table A, under Run No. 6, second item, for "50" read OO 5.0 --; column 8, line 75, for "acylate" read -- acrylate --.

Signed and sealed this 2nd day of July 1963.

(SEAL)
Attest:

ERNEST W. SWIDER
Attesting Officer

DAVID L. LADD
Commissioner of Patents